United States Patent [19]
Chang

[11] Patent Number: 5,160,634
[45] Date of Patent: Nov. 3, 1992

[54] DESALINIZATION SYSTEM

[75] Inventor: David B. Chang, Tustin, Calif.

[73] Assignee: Hughes Aircraft Company, Los Angeles, Calif.

[21] Appl. No.: 800,899

[22] Filed: Nov. 22, 1991

Related U.S. Application Data

[62] Division of Ser. No. 659,766, Feb. 25, 1991, Pat. No. 5,094,758.

[51] Int. Cl.$^5$ .................. C02F 1/30; C02F 1/34; C02F 1/58
[52] U.S. Cl. .................. 210/748; 210/702; 210/542; 210/918; 422/186; 250/432 R; 204/157.41; 204/157.48
[58] Field of Search .............. 210/702, 748, 918, 542; 422/186; 250/432 R; 204/157.15, 157.4, 157.41, 157.48, 158.2; 423/499, 659; 23/295 R, 298, 302 T, 302 R, 303

[56] References Cited

U.S. PATENT DOCUMENTS

| | | | |
|---|---|---|---|
| 4,012,301 | 3/1977 | Rich et al. | 422/186 |
| 4,469,574 | 9/1984 | Keehn et al. | 422/186 |
| 4,661,264 | 4/1987 | Goudy, Jr. | 210/748 |
| 4,662,115 | 11/1986 | O'Neill | 422/186 |
| 4,891,140 | 1/1990 | Burke, Jr. | 210/748 |
| 5,006,266 | 4/1991 | Schram | 210/748 |
| 5,026,484 | 6/1991 | Juvan | 210/748 |

*Primary Examiner*—Stanley S. Silverman
*Assistant Examiner*—Neil M. McCarthy
*Attorney, Agent, or Firm*—Michael W. Sales; Wanda K. Denson-Low

[57] ABSTRACT

A system and method are disclosed for desalinating sea water. The system includes an energy source such as a laser 13, and a container 19 (partly or wholly transparent) for holding the sea water, the sea water having sodium and chlorine ions and a solvent ($H_2O$) with a predetermined dielectric value. The system applies a predetermined amount of energy, in the form of a laser beam 35 through the transparent container 19, to the seawater substantially at a resonance frequency of the solvent, for reducing the dielectric value of the solvent and vibrating the ions, permitting them to combine and precipitate out of the seawater, thereby desalinating the seawater. To increase the effect of the beam 35, the system includes a pair of mirrors 15,17 for reflecting the beam back and forth through the sea water. The method employed by the system provides for holding the sea water in a container and applying energy to the sea water, at a resonance frequency of the solvent, sufficient to reduce the dielectric value of the solvent and vibrate the ions.

13 Claims, 1 Drawing Sheet

DESALINIZATION SYSTEM

This is a division of application Ser. No. 659,766, filed Feb. 25, 1991, now U.S. Pat. No. 5,094,758.

BACKGROUND OF THE INVENTION

This invention relates to the precipitation of solutes from solution generally, and particularly to the desalinization of sea water.

Various methods have been used to desalinate sea water. One such method which uses reverse osmosis membranes and gels with ion-selective matrices is described, for example, in D. G. Nussbaumer U.S. Pat. No. 4,147,622, entitled "Process for Manufacturing Membranes for Osmotic Separation", issued Apr. 3, 1979. One problem with this osmotic separation method is that, with the passage of time, the filters become clogged and must be maintained (cleaned or changed) frequently.

Another method which uses a distillation process is described, for example, in J. A. Burke, Jr. U.S. Pat. No. No 4,891,140, entitled "Desalinization Process", issued Jan. 2, 1990. A disadvantage in using this distillation process is that it is too energy intensive.

Still another method, which uses a freezing process, is described for example in J. K. Martin U.S. Pat. No. 4,164,854, entitled "Desalinization Method with Mercury Refrigerant", issued Aug. 21, 1979. A disadvantage with employing this method is that, generally, it requires the acquisition and use of bulky refrigeration equipment.

A system or method which avoids these disadvantages and problems, therefore, is clearly needed, and would be very useful.

SUMMARY OF THE INVENTION

The present invention avoids the disadvantages and problems associated with the prior systems/methods mentioned above.

According to one aspect of the invention, a system is provided for precipitating a solute from a solution, the solute having an anion and a cation in combination with a solvent in the solution, the solvent having a predetermined dielectric value. The system comprises a container for holding the solution, and an energy source (e.g., a laser) for applying a predetermined amount of energy to the solution substantially at a resonant frequency of the solvent, for reducing the dielectric value of the solvent and vibrating the anion and cation, enabling them to combine and precipitate out of the solution.

According to a second aspect of the invention, a method is provided for desalinating sea water, the sea water having sodium and chlorine ions, and a solvent ($H_2O$) with a predetermined dielectric value. The method comprises the steps of holding the sea water in a container, and applying a predetermined amount of energy to the seawater substantially at a resonant frequency of the solvent, for reducing the dielectric value of the solvent and vibrating the ions, permitting them to combine and precipitate out of the seawater, thereby desalinating the seawater.

DESCRIPTION OF THE PREFERRED EMBODIMENT

Figure 1:
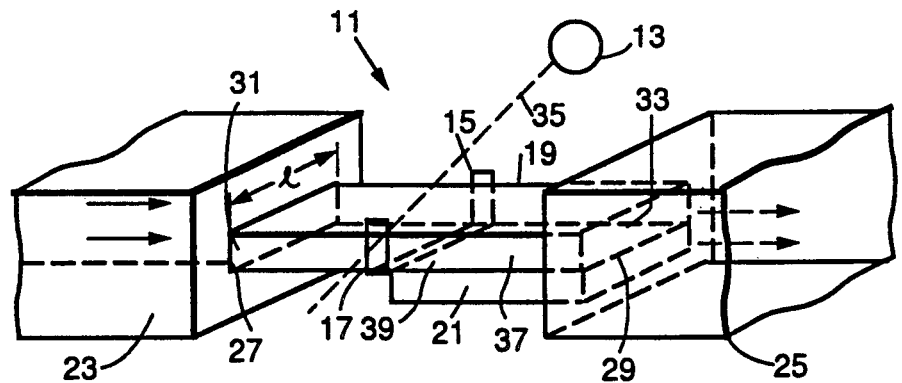
FIG. 1 is an auxiliary view of the system of the present invention showing the use of a laser energy source.

Referring now to FIG. 1, there is shown a system of the present invention for precipitating unwanted solutes from solution. The system may be used to desalinate sea water, by precipitating NaCl solute from the sea water (solution).

To achieve precipitation, the system attempts to recombine the anions (e.g., $Na^+$) and the cations (e.g., $Cl^-$) in the solution. Ordinarily, for ionically-bonded substances, the anions and cations are combined by their electrostatic forces of attraction (due to their dissimilar charges). However, where the dielectric value (also generally referred to as dielectric constant $\epsilon$) of the solvent is high (e.g., $\epsilon = 80$ for water), there is generally a decrease in the electrostatic forces of attraction, and solvation occurs. For example, for a solution with a solvent with a high $\epsilon$, the potential energy of interaction between an anion-cation pair in the solution would decrease from:

$$v = q^2/r \tag{1}$$

$$v_{(solution)} q^2/\epsilon r \tag{2}$$

where q represents the charge on each ion, r represents the distance of separation between the ions, and $\epsilon$ represents the dielectric constant of the solution.

To recombine the anions and cations in the solution, therefore, the system attempts to decrease $\epsilon$ by exciting the solution near the resonant frequency of the solvent.

The dielectric constant $\epsilon$ of the solvent may be expressed as a function of frequency $\omega$, by:

$$\epsilon(\omega) \approx 1 - \sum_i \frac{\omega_{P_i}^2}{\omega^2 - \omega_{o_i}^2} \tag{3}$$

where, $\omega_{p_i}$ represents the "plasma frequency" of the solvent ($H_2O$ molecules) at the $i^{th}$ resonance, and $\omega_{o_i}$ represents the resonance frequency of the solvent at the $i^{th}$ resonance.

The resonance frequency of the solvent ($H_2O$) may range from near infrared of the electromagnetic spectrum to far infrared. When the solution is excited near the resonance frequency of the solvent, i.e., when becomes approximately equal to $w_{oi}$, $\epsilon(\omega)$ can become very small. As shown in the following equation, as $\epsilon(\omega)$ becomes very small, the potential energy of anion-cation interaction ($V_\omega$) becomes very large:

$$V(\omega) \approx \frac{e^2}{r\epsilon(\omega)} \tag{4}$$

where $\epsilon$ represents the charge of an ion, and r represents the distance between two ions.

When the Na+ and Cl- ions are excited, the force of the Na+ attracting the Cl- exceeds the conventional force $q^2/\epsilon r$ (shown in equation 2), causing the Na+ and Cl- ions to combine (agglomerate) and form an NaCl molecule, and to precipitate out of the solution, thereby desalinating the sea water (solution).

The system shown in FIG. 1 is used to excite the ions, as described below.

The system comprises a laser source 13, a partially-transmissive partially-reflective mirror 15, a partially reflective mirror 17, and a transparent conduit 19 with a removable catch basin 21. The catch basin is removably mounted to the underside of the conduit. (With the catch basin 21 underneath, conduit 19 may alternately serve as a holding tank or container for the seawater.) The system is used in conjunction with an input tank 23 and an output tank 25. Input tank 23 provides sea water from an outside source (i.e., provides the solution comprised of Na+ and Cl- solute ions dissolved in H2O solvent), while output tank 25 provides desalinated water for outside use. Input tank 23 has an exit opening 27, and output tank 25 has an entrance or opening 29. Conduit 19 is removably coupled, in a leak-proof manner, to input and output tanks 23,25. For example, to avoid leaks, the tank openings 27,29 and the ends 31,33 of the conduit may be fitted with threaded members (not shown), permitting the ends 31,33 to be screwed into the openings 27,29. A portion 37 of the bottom of the conduit 19 (shown by cutaway 39) opens into catch basin 21, permitting solutes (NaCl molecules) to precipitate directly into the catch basin as the solution flows through the conduit 19 to the output tank 25.

Sea water flows from tank 23 into conduit 19 via openings (fittings) 27,31, where it is acted upon by laser beam 35 from laser 13. In response to the energy applied by the beam 35, Na+ and Cl+ ions in the sea water (solution) combine to form NaCl molecules which precipitate out of solution and into the catch basin 21, leaving the water desalinated as it passes from the conduit 19 (via openings/fittings 29,33) to the output tank 25. The action and effect of the laser beam 35 upon the solution is explained in greater detail below.

Figure 2:
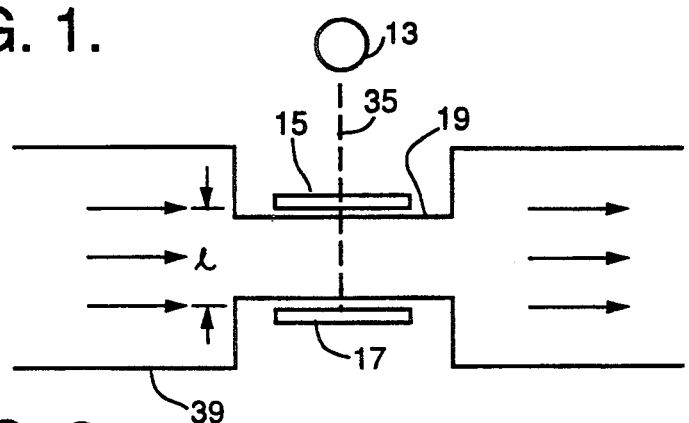
FIG. 2 is a simplified top view of the system of FIG. 1.
Figure 3:
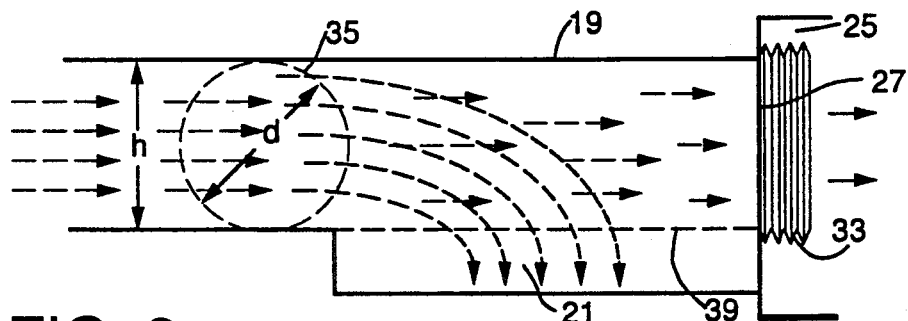
FIG. 3 is a simplified side view of the system of FIG. 1.
Figure 4:
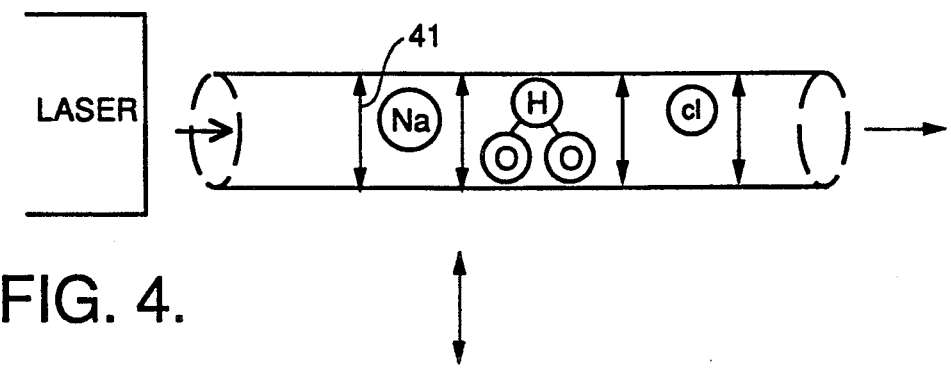
FIG. 4 is a diagrammatic illustration of vibrational effects introduced into the system of FIG. 1.

The laser beam 35, which may be produced by a tuned infrared laser source 13 such as an Erbium laser, may have a wavelength of, for example, 2.7, 4, or 7 microns. As shown in FIG. 2, the beam 35 passes through a narrow channel of water of width (1) substantially equivalent to one absorption length of the beam. Also, as shown in FIG. 3, the height (h) of the channel is equivalent to the diameter (d) of the beam 35 (or may be equivalent to the combined diameters of several beams). Mirrors 15 and 17 are arranged (disposed) in the path of the beam, one mirror 15 disposed in front of the conduit (channel) 19, and the other mirror 17 disposed behind the conduit 19. The beam 35 from the laser 13 passes through (is transmitted through) mirror 15, through the conduit 19 and the sea water 39 therein, and is reflected from mirror 17 back through the conduit and water to mirror 15. At mirror 15, the beam 35 is reflected back to mirror 17. This reflection back and forth (through the conduit and water) between mirrors 15 and 17 builds up the intensity of electric field 41 (FIG. 4), causing excitation (vibration) of the molecules of the solvent (H2O) and the anions (Na+) and cations (Cl-), with consequent agglomeration and precipitation, as described above.

While the fundamental features of the invention have been shown and described, it should be understood that various substitutions, modifications, and variations may be made by those skilled in the art without departing from the spirit or scope of the invention. Accordingly, all such modifications and variations are included within the scope of the invention as defined by the following claims. For example, conduit or container 19 may be wholly transparent or may have a transparent portion for passage of the laser beam therethrough.

I claim:

1. System for precipitating a solute from a solution, the solute having an anion and a cation in combination with a solvent in the solution, the solvent having a predetermined dielectric value, the system comprising:
   means for containing the solution; and
   means for applying a predetermined amount of energy to the solution substantially at a resonance frequency of the solvent, for reducing the dielectric value of the solvent and vibrating the anion and cation, enabling them to combine and precipitate out of the solution.

2. The system as in claim 1 wherein the means for applying is a laser, and said energy is a laser beam.

3. The system as in claim 2 wherein the solvent is water (H2O) with resonance frequencies in the range from near infrared to far infrared.

4. The system as in claim 3 wherein the means for containing is transparent, permitting passage of the laser beam therethrough and through the solution.

5. The system as in claim 4 wherein said means for containing confines the solution to a thickness corresponding to one adsorption length (1) of the laser beam.

6. The system as in claim 5 further comprising first and second mirrors for directing the laser beam back and forth through the solution, the first mirror permitting passage of the beam from the laser to the second mirror and reflecting the beam to the second mirror, the second mirror reflecting the beam to the first mirror.

7. System for desalinating sea water, the sea water having sodium and chlorine ions, and a solvent (H2O) with a predetermined dielectric value, the system comprising:
   container means for holding the sea water; and
   infrared radiation source for applying a predetermined amount of energy to the seawater substantially at a resonance frequency of the solvent, for reducing the dielectric value of the solvent and vibrating the ions, permitting them to combine and precipitate out of the seawater, thereby desalinating the seawater.

8. The system as in claim 7 wherein the solvent is water (H2O) with resonance frequencies in the range from near infrared to far infrared.

9. The system as in claim 8 wherein the infrared radiation source is a laser tuned to a predetermined one of said resonance frequencies, and said energy is a beam from said laser.

10. The system as in claim 9 wherein the container means is transparent, permitting passage of the laser beam therethrough and through the sea water.

11. The system as in claim 10 wherein said container means confines the solution to a thickness corresponding to one adsorption length (1) of the laser beam.

12. The system as in claim 11 further comprising first and second mirrors for directing the laser beam back and forth through the sea water, the first mirror permitting passage of the beam from the laser to the second mirror and reflecting the beam to the second mirror, the second mirror reflecting the beam to the first mirror.

13. The system is in claim 12 wherein said laser is an Erbium laser.

* * * * *